United States Patent Office 3,464,555
Patented Sept. 2, 1969

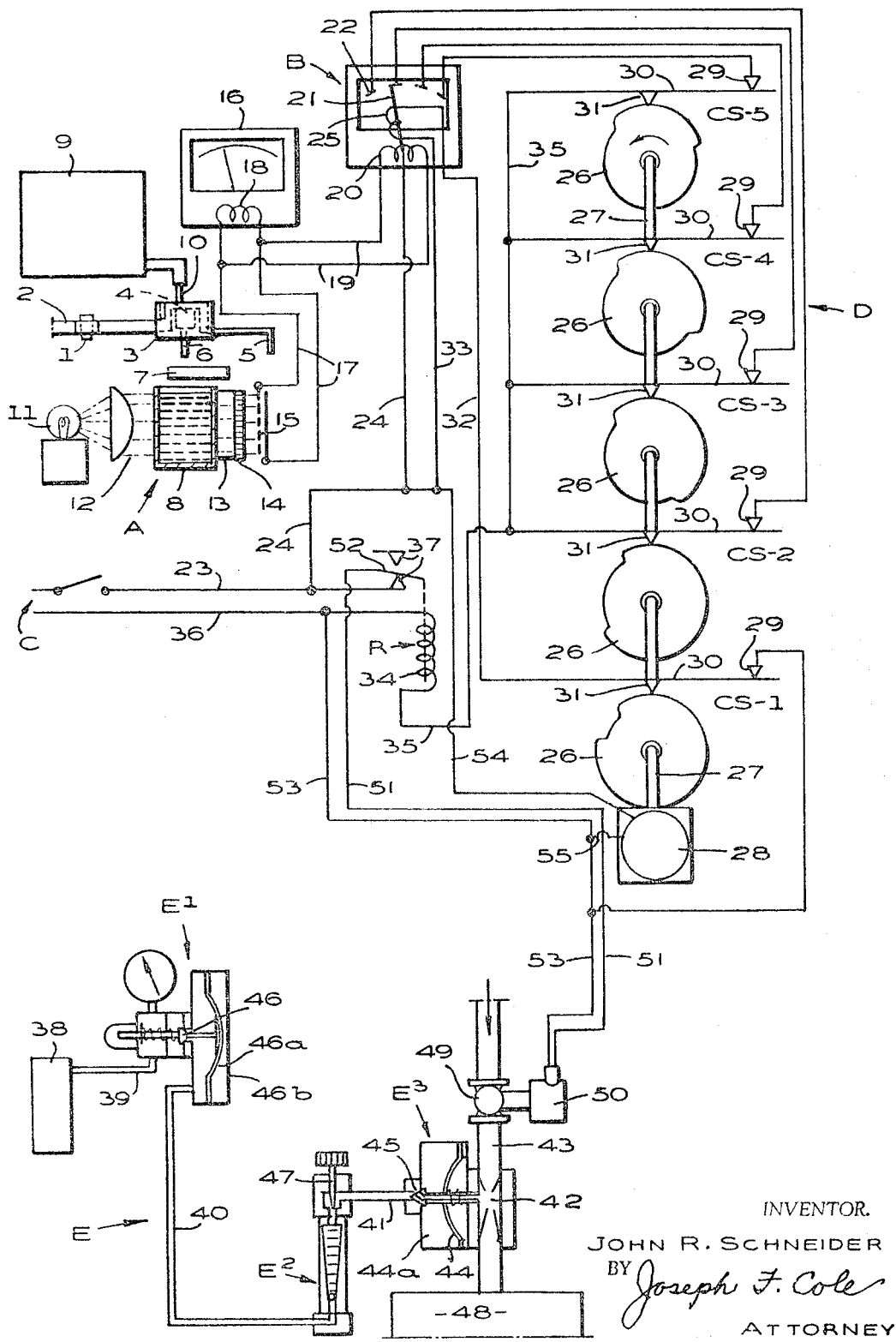

3,464,555
AUTOMATIC CONTROL FOR CHLORINE FEED
John R. Schneider, Belvedere, Calif.
(P.O. Box 426, Tiburon, Calif. 94920)
Continuation-in-part of application Ser. No. 528,720, Feb. 21, 1966. This application Oct. 6, 1967, Ser. No. 673,313
Int. Cl. B01d 35/06, 35/00
U.S. Cl. 210—85                                    3 Claims

ABSTRACT OF THE DISCLOSURE

This invention relates to an automatic device for controlling the quantity of chlorine fed to a liquid process, or water supply, in direct proportion to the chlorine demand of the liquid process or water supply The invention has particular advantages when applied to a municipal water supply, an industrial water supply, a swimming pool, a water cooling tower, or any other water supply where bacteria is present.

CROSS-REFERENCE TO RELATED APPLICATION

This application claims in part subject matter disclosed in applicant's prior copending application, Ser. No. 528,720, filed Feb. 21, 1966, now Patent No. 3,349,913. Both applications disclose a readout meter, a multi-contact meter-relay and a motor-driven cam switch. However, said copending application relates to an automatic device for controlling feed of aids to filtration and employs a turbimeter, while the present application pertains to an automatic control for chlorine feed and includes a chlorine analyzer.

BACKGROUND OF THE INVENTION

Most all potable water supplies and many industrial water supplies are treated with chlorine for its sterilizing effect on various microorganisms, pathogenic and non-pathogenic bacteria, algae, molds, slimes, etc.

The quantity of chlorine required to do a safe and thorough sterilizing job depends an the amount of bacteria and other objectionable materials, mentioned above in the water supply. In the "art," the quantity of chlorine required to do a safe sterilizing job is referred to as the "chlorine demand" of the liquid. In other words, the "chlorine demand" of the liquid is in direct proportion to the quantity of bacteria and other objectionable material, as mentioned before, in the liquid supply.

The chlorine is consumed by its sterilizing action, so if the quantity of chlorine fed to the liquid to be sterilized is not great enough to do the proper sterilizing job, some of the bacteria and other objectionable materials, mentioned above, will not be sterilized and the liquid will not be safe for drinking, swimming, etc.

The quantity of bacteria and other objectionable organisms in the water cannot be read on an indicating meter, but must be cultured to determine their quantity. This takes time, sometimes as long as a week, so the normal procedure in a water treatment operation is to over chlorinate the water and then measure the residual of chlorine still in the water after its treatment by chlorine exposure. Any residual of chlorine in the water after treatment is an excess, not required by the water to sterilize all the bacteria.

SUMMARY OF THE INVENTION

It is much better to have an excess of chlorine in the water than not enough from a safety-to-health standpoint, but too great a chlorine residual in the water after treatment is objectionable from a taste and odor standpoint. The ideal situation is to automatically feed just slightly more chlorine than the water requires to do a thorough and complete sterilizing job, but not enough more to cause a taste and odor offense.

In order to achieve this ideal situation a very close automatic control must be maintained at all times. As the chlorine demand of the water changes so must the quantity of chlorine being fed to the systemchanger. By always maintaining a proper ratio of chlorine feed to "chlorine demand" a safe and non-objectionable water can be obtained, regardless of the bacteria count changes of the incoming water.

With my invention the ideal situation, as mentioned above, can be achieved automatically and maintained continually.

BRIEF DESCRIPTION OF THE DRAWING

For a better understanding of the invention, reference should be had to the accompanying drawing, forming part of this specification, in which the view is a schematic disclosure of my automatic control for chlorine feed.

DESCRIPTION OF THE PREFERRED EMBODIMENT

It will be noted that I have shown a conventional and continuous automatic chlorine analyzer A of the colorimetric type. The analysis is performed colorimetrically by the orthotoldine method, on a continuously flowing water sample stream for total available chlorine. In the drawing, I show a schematic flow diagram of the analyzer A.

The water sample passes through a sample cock 1 in an inlet pipe 2, where its flow is adjusted and from there it enters in the analyzer head regulator 3. The head regulator fills with water sample and then overflows the cup 4 into waste outlet 5, thus establishing a constant level or head. Inserted in the bottom of the head regulator is a water sample capillary or metering orifice 6 of such size that a stream discharge onto the sample heater 7 and into the sample cell 8 below. Orthotoldine solution from tank 9 is metered through a reagent metering capillary 10 and discharges into and blends with the water sample stream before it enters the water sample capillary 6. The treated water sample leaves the capillary 6 and flows onto the sample heater 7 and into the sample cell 8. The latter fills and overflows, and in so doing, it detains the sample orthotoldine mixture an average of three minutes. If chlorine is present in the water sample stream, a yellow color develops in the sample cell 8, the intensity of which is dependent upon the amount of chlorine present.

A lamp 11 sends light rays 12 through the sample cell 8, through a light duct 13 and through a blue color filter 14 and onto a photocell 15. The photocell output is indicated as a signal on a readout meter 16, it being noted that the former is electrically connected to the latter by wires 17. This meter has a pointer-operating coil 18 to which the wires 17 are connected. The photocell also is connected by wires 19 to a meter-relay B.

Although I have illustrated a colorimetric system chlorine analyzer in the drawing, an amperometric system chlorine analyzer of conventional design can be just as well used for a signal to meter-relay B.

With further reference to the drawing, it will be seen that the multi-contact meter-relay B is connected by the wires 19 to the wires 17 of the chlorine analyzer A, and that wires 19 are connected to a coil 20 of the meter-relay B that actuates or swings a meter relay arm 21. This meter-relay is a combination meter, sensitive to voltage or current, and a switching device with any number of spaced contacts 22.

It will be noted that a source of current C has a wire 23 which is connected by a branch wire 24 to the meter-relay arm 21. The meter-relay B takes a signal from the chlorine analyzer A which, in turn, swings the arm 21 to a position corresponding to the chlorine residual being read on the meter 16 by the chlorine analyzer. Although the signal from the chlorine analyzer is continuous to the meter-relay arm 21, the latter cannot move unless the current is "off" of a read-out coil 25 which in turn holds the arm 21 down tight against the meter contacts 22. When this read-out coil is energized, the arm 21 is held down tight, closing the electrical circuit from the wire 24 to a contact 22 corresponding to the position of the meter-relay arm 21.

As a further part of the device, there is provided a motor-driven cam switch designated generally at D with any number of cams 26 being secured to a shaft 27, Motor 28 drives this cam arrangement at a set speed, such as one revolution every thirty seconds, or some other set time, as desired.

The cam switch D has a plurality of switches designated generally at CS–1, CS–2, CS–3, CS–4 and CS–5. Each of these switches is provided by a stationary contact 29 and a movable contact finger 30, the latter being actuated by a follower 31 that rides on the periphery of one of the cams 26.

Cam switch CS–1 closes first, energizing the read-out coil 25 through wires 32 and 33, and clamping the meter-relay arm 21 down against the meter-relay contact 22 under this arm at the time. As the cam arrangement turns further, the other cam switches CS—2 to CS—5, inclusive, close in succession. This energizes relay R which has one end of its coil 34 connected by wire 35 to the cam switches CS–2, CS–3, CS–4 and CS–5, the other end of the coil 34 being connected to a wire 36 leading to the source of current C. This closes contacts 37 of the relay R. The purpose of the cam switches CS–2 to CS–5, inclusive, will be set forth as the specification proceeds.

A conventional chlorine feed device is shown at E, and this device takes chlorine gas from a pressurized vessel 38 and entrains it in water, or other liquids, generally for the purpose of sterilizing the liquid.

In its strfuctural features, the chlorine feed device E has a gas shut-off and pressure reducing valve unit E¹ that is connected by a gas inlet pipe 39 to the pressurized vessel 38. This unit E¹ is connected by a pipe 40 to a rotameter E², and the latter is connected by a pipe 41 to an ejector check valve unit E³ of the aspirator type.

When liquid flows through an aspirator 42 in a feed pipe 43, a vacuum is created which pulls on a diaphragm 44 that is mounted in a housing 44a and opens a spring-loaded valve 45, thus evacuating the system and permitting atmospheric pressure to open a spring-loaded gas inlet valve 46 of the gas shut-off and pressure reducing unit E¹. Valve 46 is attached to diaphragm 46a mounted in housing 46b. Chlorine gas then flows through pipe 40 to the variable area rotameter E², then past a manual metering valve 47 to the open ejector check valve 45 and on into the ejector, where the gas is entrained in the liquid forming a chlorine solution. The latter flows through pipe 43 to a place where the chlorine is to be used, for example, a tank 48.

As long as a vacuum is maintained by the ejector E³ at the spring-loaded check valve 45 and through the system to the spring-loaded gas inlet valve 46, chlorine gas can flow through the system from the spring-loaded gas inlet valve 46 to the ejector E³ where it mixes with the liquid in pipe 43 forming a chlorine solution.

However, if the vacuum is lost for any reason, the spring-loaded gas inlet valve 46 and the spring-loaded check valve 45 close, stopping the flow of gas from vessel 38 to the ejector E³. By opening a solenoid liquid feed valve 49 of the chlorine feed device E, and allowing liquid to flow through the aspirator type ejector E³, a vacuum is created which in turn opens the spring-loaded check valve 45 and the spring-loaded gas inlet valve 46, allowing chlorine gas to flow through the system and into the liquid at the ejector, and forming a chlorine solution. By closing valve 49 of the chlorine feed device, stopping the flow of liquid through pipe 43 and the aspirator ejector 42, vacuum is lost and the spring-loaded check valve 45 and the spring-loaded gas inlet valve 46 close, stopping the flow of chlorine gas to the system.

Returning now to the electrical circuits, it will be noted that the normally-closed feed valve 49 has a solenoid 50 connected thereto for opening this valve. The solenoid has one wire 51 leading to the armature 52 of the relay R and a second wire 53 leads from the solenoid to the wire 36 of the source of current C. This will open feed valve 49 when cam switch CS–1 is closed.

Motor 28 is connected by wires 54 and 55 to wires 24 and 53, respectively, and wires 24 and 53 are connected in turn to the wires 23 and 36, respectively of the source of current C.

Cam switch CS–1 is used to energize the read-out coil 25. The cam switches CS–2, CS–3, CS–4 and CS–5 are used to energize the solenoid 50 and thus open the feed valve 49 for various periods of time, depending upon the cams 26 associated with these respective cam switches and thus controlling the quantity of chlorine being used in the liquid. When the cam switch connected to the contact 22 being used on the meter-relay B opens, the feed solenoid 50 deenergizes, closing the feed valve 49 and stopping further feed of the chlorine.

I claim:

1. In an automatic control for chlorine feed:
   (a) a continuous automatic chlorine analyzer operable to produce an electrical output signal of an intensity in direct proportion to chlorine residual in a liquid sample;
   (b) a readout meter electrically connected to the analyzer to indicate the output signal from the analyzer;
   (c) a meter-relay electrically connected to the analyzer and readout meter to take the output signal from the analyzer corresponding to the chlorine residual being read on the readout meter;
   (d) a chlorine feed device coupled to a supply of chlorine gas, and operable to entrain the chlorine gas in flowing liquid to form a chlorine solution for the purpose of sterilizing the liquid;
   (e) a feed valve operable for controlling the flow of the liquid and chlorine solution;
   (f) operating means connected to the meter-relay and the feed valve for controlling the quantity of chlorine fed to a liquid process or water supply in direct proportion to the chlorine demand to effect a thorough and complete sterilizing thereof;
   (g) the meter-relay being of the multi-contact type having a number of spaced contacts, and a meter-relay arm is movable over these contacts in succession, the arm being actuated by the electrical output signal from the analyzer and movable to a position corresponding to the chlorine residual in the liquid sample;
   (h) the meter-relay arm being connected to a source of current, and the meter-relay having a read-out coil for holding the arm down tight closing the electrical circuit from the source of current to a contact of the meter-relay corresponding to the position of the arm.

2. The automatic control for chlorine feed, as set forth in claim 1;
   (i) and in which the operating means includes:
      (1) a motor-driven cam arrangement having a number of cams driven by a motor at a set speed;
      (2) a cam switch associated with and actuated by each of the cams so that the cam switches will be opened and closed as the cams are rotated;

(3) one of these cam switches being made to close first, and being electrically connected to the read-out coil to clamp the meter-relay arm down against the meter-relay contact under their arm;

(4) the other cam switches being electrically connected to the meter-relay contacts and made to close in succession as the cam arrangement turns further so as to energize a relay, the latter being connected to a source of current;

(5) the feed valve being of the solenoid operated type and the solenoid being electrically connected to the relay so as to open this valve when the relay is energized, whereby chlorine gas will be entrained in the flowing liquid or water.

3. The automatic control for chlorine feed, as set forth in claim 2;

(j) and in which said one of the cams that is made to be closed first is opened after all of the other cam switches are opened and no current is flowing through the meter-relay contacts, whereby the meter-relay arm will lift free of the meter-relay contacts.

References Cited
UNITED STATES PATENTS

| | | | |
|---|---|---|---|
| 2,405,479 | 8/1946 | Whitlock | 210—96 X |
| 2,989,037 | 6/1961 | Filippino et al. | 210—96 X |
| 2,999,797 | 9/1961 | Campbell | 210—96 X |

FOREIGN PATENTS 857,794  1/1961  Great Britain.

REUBEN FRIEDMAN, Primary Examiner

J. W. ADEE, Assistant Examiner

U.S. Cl. X.R.

210—96